(12) United States Patent
Rodgers

(10) Patent No.: US 8,960,220 B2
(45) Date of Patent: Feb. 24, 2015

(54) LIQUID MASS MEASUREMENT AND FLUID TRANSMITTING APPARATUS

(75) Inventor: Donald B Rodgers, Saugerties, NY (US)

(73) Assignee: Ceres Technologies, Inc., Saugerties, NY (US)

(*) Notice: Subject to any disclaimer, the term of this patent is extended or adjusted under 35 U.S.C. 154(b) by 955 days.

(21) Appl. No.: 13/088,796

(22) Filed: Apr. 18, 2011

(65) Prior Publication Data

US 2012/0260998 A1    Oct. 18, 2012

(51) Int. Cl.
*G05D 7/00* (2006.01)
*G05D 7/06* (2006.01)
*G01G 17/06* (2006.01)
*G01F 23/16* (2006.01)

(52) U.S. Cl.
CPC ............. *G05D 7/0647* (2013.01); *G01G 17/06* (2013.01); *G01F 23/164* (2013.01)
USPC ............................. 137/334; 137/391; 137/408

(58) Field of Classification Search
USPC ................. 137/334, 391, 403, 406–408, 581; 222/55, 58, 77; 141/83, 359
See application file for complete search history.

(56) References Cited

U.S. PATENT DOCUMENTS

| | | | | |
|---|---|---|---|---|
| 3,930,258 A | * | 12/1975 | Dick et al. | 137/408 |
| 4,111,272 A | * | 9/1978 | Ricciardi et al. | 222/58 |
| 4,132,242 A | * | 1/1979 | Carroll, Jr. | 137/403 |
| 4,436,674 A | | 3/1984 | McMenamin | |
| 4,491,016 A | * | 1/1985 | Haefner | 137/403 |
| 5,505,335 A | * | 4/1996 | Uemura et al. | 222/77 |
| 5,535,635 A | * | 7/1996 | Shaw | 73/863.84 |
| 6,026,837 A | * | 2/2000 | Chen | 137/403 |
| 6,038,919 A | | 3/2000 | Schmitt et al. | |
| 6,123,765 A | * | 9/2000 | Sinha et al. | 117/84 |
| 6,164,189 A | * | 12/2000 | Anson | 222/77 |
| 6,588,458 B2 | * | 7/2003 | Rodgers | 141/83 |
| 7,770,448 B2 | * | 8/2010 | Misra et al. | 73/296 |

(Continued)

FOREIGN PATENT DOCUMENTS

JP     2008-107298 A    5/2008
KR  10-2008-0096684 A  10/2008

OTHER PUBLICATIONS

International Search Report and Written Opinion for International Application No. PCT/US2012/034056, dated Nov. 12, 2012.

(Continued)

*Primary Examiner* — Eric Keasel
(74) *Attorney, Agent, or Firm* — Heslin Rothenberg Farley & Mesiti P.C.

(57) ABSTRACT

A liquid mass measurement and fluid transmitting apparatus includes a container for measurement of a mass of fluid therein. A sensor is coupled to the container which measures a mass of fluid within the container independent of variations of pressure within the container. A diaphragm sensor may be located on the bottom of the container whereby electrical signals representing the mass of fluid within the cylinder are created by movement of the diaphragm caused by the mass of fluid thereon. A pressure equalizer which equalizes the pressure within the container to the pressure on the opposite side of the diaphragm allows the measurement of the mass to occur independent of any variations and pressure within the container. Liquid within the mass of liquid within the container can be accurately measured such that a desired mass of liquid may be transmitted for further use. The liquid may be vaporized and transmitted as a vapor.

26 Claims, 3 Drawing Sheets

(56) References Cited

U.S. PATENT DOCUMENTS 8,602,069 B2 * 12/2013 Popa et al. .................... 141/83
2006/0144136 A1 7/2006 Dutton et al.

OTHER PUBLICATIONS

"Low Range, High Line Differential Pressure Transmitter Models 216, 316"—A5SL-16.00 Rev A 2 pages, published at least as early as 2010.

* cited by examiner

LIQUID MASS MEASUREMENT AND FLUID TRANSMITTING APPARATUS

TECHNICAL FIELD

The present invention relates to the field of fluid flow measurement and control, and more particularly to systems for delivery of a measured amount of liquid mass or vaporized liquid mass.

BACKGROUND OF THE INVENTION

Various industrial processes require the introduction of precise amounts of liquid or vaporized liquid. For many processes, the liquid or vapor delivery rate must be precisely measured and controlled to achieve acceptable results. Such processes include, for example, blood diagnostics, titration, dosing, chamber humidification, vapor deposition, stripping, annealing, and chemical etching.

Conventional liquid and vapor mass delivery systems rely on techniques such as displacement metering pumps, time based pressure dispense, thermal based flow controllers, ultrasonic, differential pressure, and Coriolis. Although each such system has specific shortcomings, a common disadvantage is their lack of immunity to entrained gases. To reduce the error caused by entrained gases many liquid flow controller manufacturers recommend the installation of degassing equipment. This equipment adds to the cost and complexity of the delivery system and also introduces another potential error, namely the efficiency of the degassing process.

Conventional vapor delivery systems include bubblers, evaporators, and flash vaporizers. With each such vapor delivery system multiple devices are required to deliver the vapors of the precursor to the process chamber. A disadvantage of bubblers is the resulting shift in the ratio of chemical vapor to carrier gas when the liquid temperature or bubbler pressure change. Although bubbler vapor output feed-back compensation techniques have been developed to compensate for these influences, they significantly increase the cost of the system. A disadvantage of evaporators is that a mass flow control device is still required to control and report the flow rate of the vaporized precursor. Furthermore the delivery of reactive chemical vapors can affect the accuracy of the flow control device or cause it to prematurely fail. A disadvantage of flash evaporators is that they require a liquid flow control device, such as a volumetric displacement pump or liquid mass flow controller to inject a precise amount of liquid into a heated chamber held at a temperature sufficient to vaporize the liquid. Such liquid injection techniques introduce potentially significant errors, and the temperature of the vaporizer must often be held at or above the decomposition temperature of the chemical.

OBJECTIVE OF THE INVENTION

It is therefore an objective of the present invention is to provide a liquid mass measurement and fluid transmitting apparatus which provides a direct indication of its resident mass regardless of fluctuations in liquid temperature, applied pressure, and concentration of dissolved gases in the liquid.

Another objective of the present invention is to provide a means of controlling the introduction or extraction of a precise mass of liquid to support a process. Still another objective of the present invention is to provide an apparatus which facilitates the processing of various liquid chemicals, which can be added together to achieve a precise mixture. Yet another objective of the present invention is to provide a system which facilitates the reporting and controlling the delivery of vapor-phase liquids to support a process. And, still another objective of the present invention is to provide a means of totalizing the mass of a precursor moved through the device over a prescribed period of time.

SUMMARY OF THE INVENTION

The present invention provides a means of measuring and reporting the total mass of liquid contained within a container regardless of fluctuations in liquid temperature, applied pressure, and concentration of dissolved gases in the liquid.

In one aspect of the invention, a parameter to be measured is the resident liquid mass contained within a container and the controlled delivery of a precise amount of mass introduced or extracted from the container. In another aspect of the invention, the parameter to be measured is the resident liquid mass contained within the container and the extraction of vapor phase mass therefrom.

In its simplest form, the apparatus comprises a sensor in communication with a container, such as containment column having one or more conduits in connection therewith, a means of controlling the movement of fluid through said conduits, and a method of bi-directional communication with the sensor and fluid transport control system. Furthermore, the sensor is capable of detecting the mass of a liquid in the column independent of the containment pressure.

In one aspect of the invention, there is provided a fluid mass measurement and transmitting system which includes a sensor coupled to a container. The sensor is configured to produce one or more electrical signals proportional to a mass of fluid within the container independent of variations in pressure on the liquid. The system also includes an inlet in fluid flow communication with the container and a fluid outlet in fluid flow communication with the container to allow fluid to be transmitted from the container. A controller is electrically coupled to the sensor to receive and process the electrical signals. The controller provides measurements of the liquid mass within the container, and may also control the amount of fluid added to, or removed from the container. The controller may also control other devices within the system to control and/or monitor various parameters, such as pressure and temperature.

The system may further include a flow control inlet valve coupled to the fluid outlet and a flow control outlet valve coupled to said fluid inlet. The controller is electrically coupled to the flow control inlet valve and the flow control outlet valve. A pressure sensor may be coupled to the container for sensing the pressure therein. One or more pressurization conduits may be coupled to the container to control the pressure exerted within the container. The pressurization conduits may be coupled to or may include one or more control valves, which are electrically coupled to the controller. The controller may be configured to control the rate of flow of fluid transmitted from the container through said fluid outlet. The system may include a temperature sensor coupled to the container and to the controller and a heater coupled to said container. The controller is configured to control the temperature and/or pressure within said container to allow said fluid to change from a liquid to a vapor.

The sensor may be a diaphragm type sensor oriented to sense changes in the mass of fluid within said container, wherein fluid within the container is located over the diaphragm. A pressure equalizer may be operatively connected to the sensor to equalize pressures exerted towards both sides of the diaphragm. The pressure equalizer may comprise a conduit having a first end in fluid communication within the container at a location above the liquid therein, and a second end in fluid communication with an area proximate a side of the diaphragm facing opposite the fluid within the container.

In accordance with the invention, as liquid is introduced into, or removed from, the container, the sensor output signal changes in direct relationship to the change in resident liquid mass independent of any change in containment vessel pneumatic pressure. The movement of precise amounts of liquid mass can be transported into, or out of, the system at pressure conditions ranging from sub-atmospheric to 68 bar (1000 psi). In one possible application, high vapor pressure fluids can be monitored and transported as a liquid, which provides a significant accuracy advantage compared to vapor phase measurement technologies. In another possible application pressure sensitive liquids can be handled and managed at low vacuum conditions ($\leq 10\Lambda^{-4}$ atmospheres).

In another aspect of the invention, and in its simplest form, the apparatus comprises a sensor in communication with a container having one or more conduits in communication therewith, a means of controlling the movement of fluid through the conduits, and a method of bi-directional communication with the sensor and fluid transport control means. Furthermore, a means of converting the liquid into vapor is included. Additional features useable with the invention include, but are not limited to, introducing a sweep gas across the top of the liquid within the container, aspirating a carrier gas up through the liquid, and/or thermally inducing phase change.

BRIEF DESCRIPTION OF THE DRAWINGS

The invention may be performed in various ways and several embodiments will be described, by way of example, with reference to the accompanying drawing, which is a schematic representation of the apparatus.

DETAILED DESCRIPTION OF THE DRAWINGS

Figure 1:
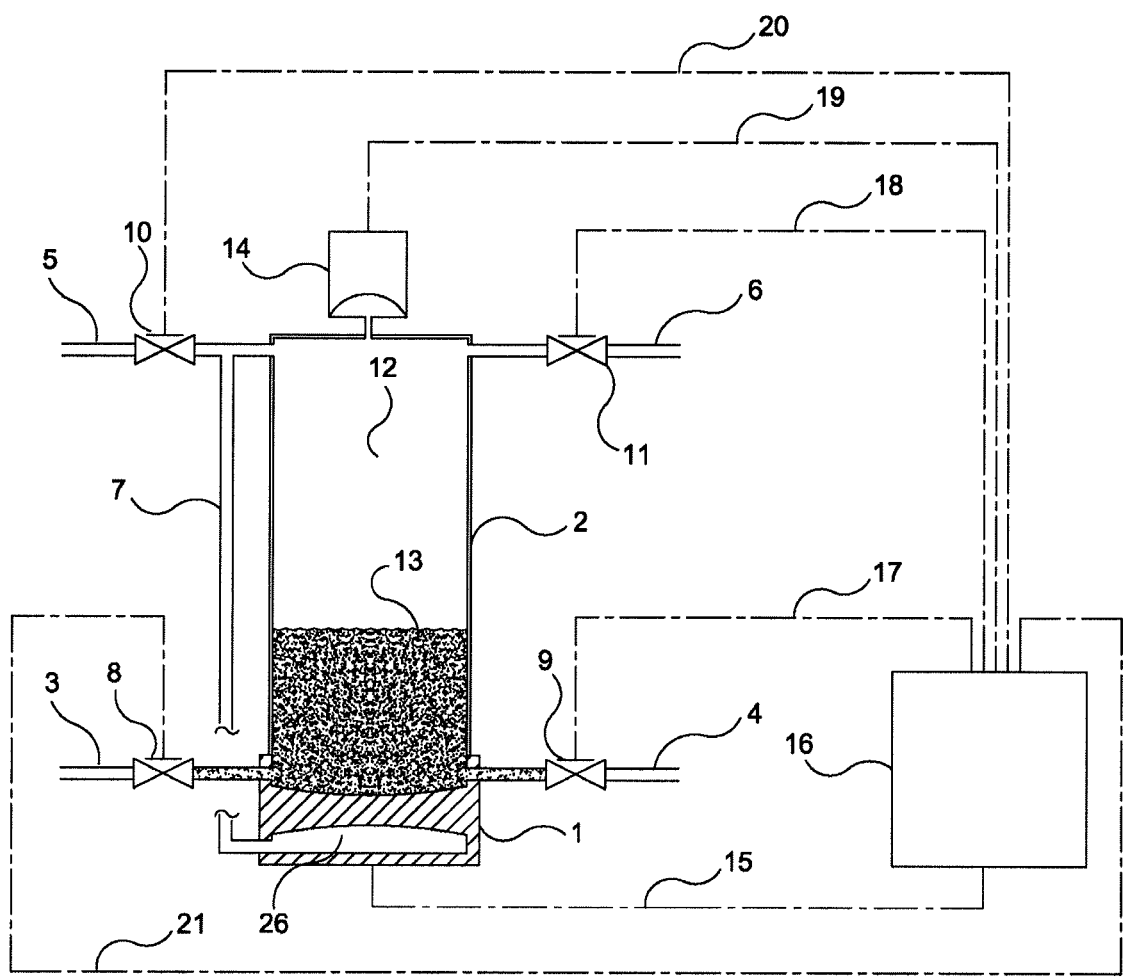
FIG. 1 is a block diagram illustrating the arrangement of the apparatus to support the measurement and dispense of precise mass shots of liquid according to the present invention.

FIG. 1 is a block diagram according to one aspect of the invention. Referring to FIG. 1, the apparatus according to one aspect of the invention includes a container in the form of a containment column 2. Located at the bottom of the container is a mass sensor 1. The mass sensor 1 is a diaphragm type mass sensor which includes a diaphragm that senses a force thereon and transmits an electrical signal representative of the value of said force. An example of such a sensor is the Model 216 or 316 sensor commercially available from GP:50 Company of Grand Island New York, USA. The sensor 1 is mounted to the bottom of the containment column 2 such that the liquid 13 therein imparts a force on the diaphragm of the sensor 1. Such force is representative of the mass of the liquid 13 within the column 2. The sensor 1 transmits an electrical signal via an electrical connection 15 to a controller 16. The controller processes the electrical signal 15 into a measurement of a mass of liquid 13 within the column 2. The diaphragm within the sensor 1 includes a first side which supports and faces the liquid 13 within the column 2. An opposite side or face of the diaphragm within the sensor 1 faces opposite the liquid and proximate a cavity 26. A pressure equalizer is coupled between the column 2 into the cavity to equalize the pressure within the cavity 26 and the column 2 above the liquid 13 therein. Accordingly, the sensor 1 will measure the mass of liquid 13 independent of variations of pressure within the column 2, as well as variations caused by changes in temperature and entrained gases within the column 2.

An inlet 3 is in fluid flow communication with the column 2, and includes an inlet flow control device 8 such as a valve. The inlet flow control device 8 is coupled to the controller 16 via an electrical connection 21 to allow the controller to control the amount of fluid, whether in liquid or vapor form, to flow into column 2. An outlet 4 is also in fluid flow communication with the column 2 and includes an outlet flow control device 9 such as a valve. The outlet flow control device 9 is coupled to the controller 16 via an electrical connection 17 to allow the controller to control the amount of fluid, whether in liquid or vapor form, to flow out of said column 2.

One or more pressure control conduits 5, 6 are in fluid communication with the column 2 to control the pressure 12 within the container 2. The one or more pressure control conduits may include one or more pressure control valves 10, 11 to control the flow of fluid within said conduits 5, 6. As shown in FIG. 1, a pressure supply conduit 6 includes an isolation valve 11. The isolation valve 11 is connected to the controller 16 via an electrical connection 18 to control the opening and closing of the isolation valve 11 to allow pressurized fluid to flow via conduit 6 into column 2. Pressure relief conduit 5 may also be used to allow pressurized fluid such as gas within the column 2 to escape from therein. An isolation valve 10 is also connected to the controller 16 via electrical connection 20. The controller 16 is also electrically connected to a pressure sensor 14 via electrical connection 19 to read an electrical signal from pressure sensor 14 representative of the pressure 12 within the column 2. Based upon the pressure within column 2, the controller can control the amount of pressurized fluid within the container via conduit 6 by controlling isolation valve 11. And, the pressure within column 2 can be controlled by the controller 16 by the controller sending a signal to control isolation valve 10 by allowing pressurized fluid such as gas within the column 2 to escape via conduit 5 from the isolation valve 11.

The sensor 1 is in direct communication with the base of containment column 2 and indirectly in communication with the top of containment column 2 through a pressure equalizer such as a conduit 7. When containment column 2 is void of liquid, sensor signal 15 is at its lowest value. If the pressure 12 within the column 2 changes, the pressure change is also transmitted to an opposing face of a diaphragm in sensor 1 through conduit 7 and output signal 15 remains unchanged. When liquid is introduced into column 2, through conduit 3 the output signal of sensor 1 increases in direct relationship to the rate of mass gain. Conversely, if liquid is removed from column 2, sensor 1 output signal decreases in direct relationship to the rate of mass reduction. The controller 16 may be capable of measuring and monitoring the rate of mass gain within the column.

In one example, the internal volume of containment column 2 is 2 cubic centimeters and has an allowable liquid working volume equivalent to 1 ½ cubic centimeter $H_2O$ at 20 degrees Celsius, which is a general limitation that prevents containment column 2 from being overfilled. Also in this example sensor 1 output signal 15 is 0-10 volts. In a dry state sensor signal 15 is 0 regardless of column 2 pressure condition 12 because the force is applied to both sides of sensor 1. As liquid is introduced into containment column 2 force is applied to the top face of the diaphragm within the sensor 1 causing the sensor signal 15 to increase. Furthermore in this example controller 16 receives and converts senor 1 output signal 15 to grams. If pure water were being introduced sensor output signal 15 would reach 10 volts at a mass of 1.497 grams of liquid. If the substance were mercury sensor 1 output signal would also be 10 volts at 1.497 grams of liquid but the denser liquid would only occupy 0.11 cubic centimeters of containment column 2. The output signal of sensor 1 is directly related to the resident mass residing in containment column 2 irrespective of liquid density, the temperature in the column and/or pressure at the top of the column. The resolution of the sensor 1 output signal may be 0.00015 grams/millivolt, making it possible to accurately detect the movement of very small amounts of mass.

In another example, the internal volume of containment column 2 is 1000 cubic centimeters and it has an allowable liquid working volume of 750 cubic centimeters H2O at 20 degrees Celsius. In this example, 500 grams of pure water introduced into containment column 2 results in 6.6786 volts for sensor 1 output signal. This represents a mass-to-signal ratio of approximately 0.075 grams/millivolt.

Yet in another example, and a continuance of the first example, column 2 has an allowable working volume equivalent to 1 ½ cubic centimeters $H_2O$ at 20 degrees Celsius (1.497 grams water). Conduit 3 is connected to an adequately pressurized water supply. Water is introduced into containment column 2 when conduit isolation valve 8 receives actuation signal 21 from control system 16. Control system 16 terminates actuation signal 21 when sensor 1 output signal 15 reaches 9 volts (user defined fill value). At this point, the mass of water in column 2 is 1.3473 grams. A user defines a desired liquid dispense mass of 0.50 grams through interaction with controller 16. Controller 16 calculates a delta sensor signal voltage associated with the defined dispense mass (3.34 volts=0.50 grams). A dispense command is issued and controller 16 stores the starting sensor 1 output signal value and communicates an actuation signal 17 to conduit isolation valve 9. As liquid flows out of containment column 2 through conduit 4 sensor 1 signal 15 descends. Controller 16 monitors sensor 1 output signal and terminates the dispense event when the actual signal is equal to the starting signal minus the delta volts calculation. If the user has defined that a column 2 refill occur following each dispense controller 16 transmits an actuation signal via connection 21. Containment column 2 refill event is terminated when sensor 1 output signal reaches 9 volts.

The liquid dispense pressure 12 is monitored by pressure sensor 14 and communicated to controller 16. If containment column 2 pressure 12 is less than that specified by the user controller 16 communicates an actuation signal 18 to conduit 6 isolation valve. Conduit 6 inlet is common with an appropriately pressurized gas supply. When containment column 2 pressure 12 is equal to the user defined value conduit 6 isolation valve 11 is closed. If pressure 12 exceeds a user defined value conduit 5 isolation valve 10 is opened and containment column 2 pressure 12 is reduced.

Figure 2:
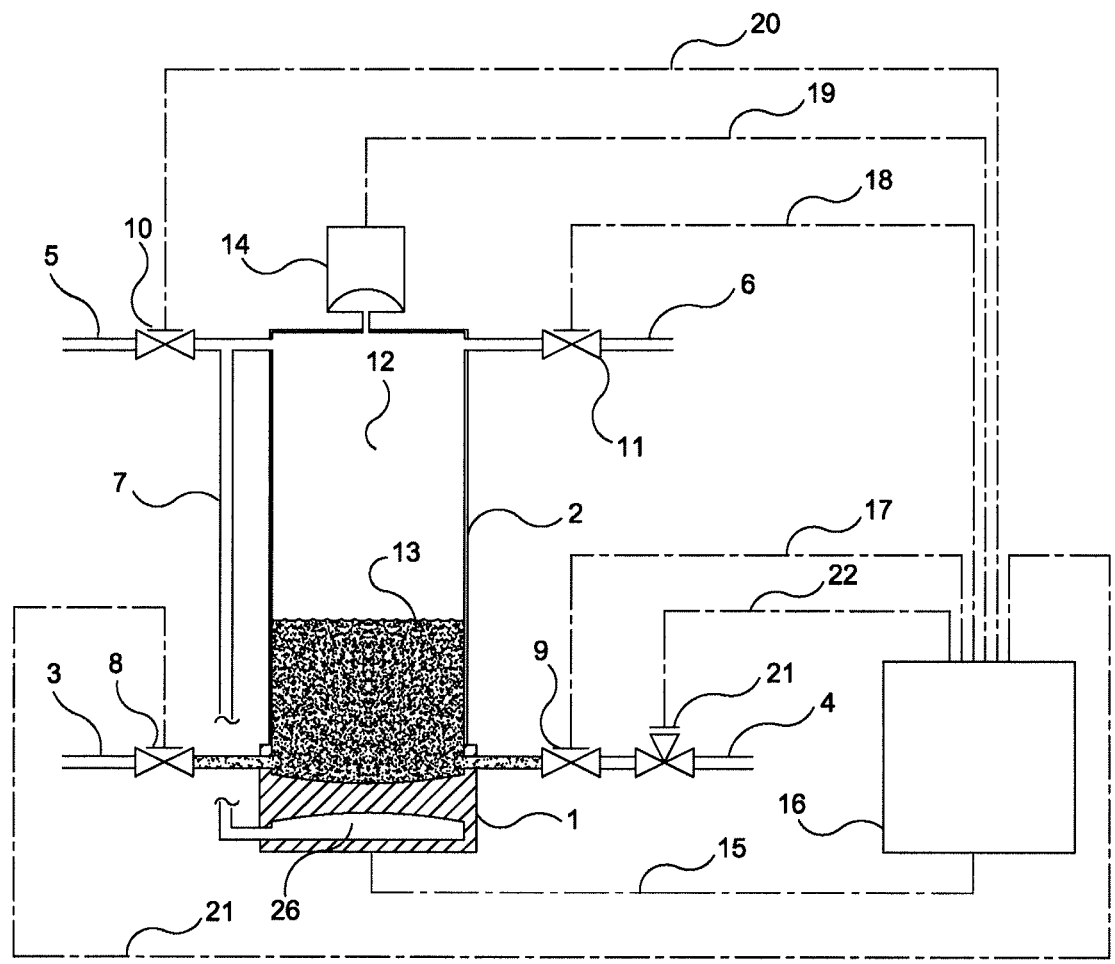
FIG. 2 is a block diagram illustrating another embodiment of the apparatus to support the measurement and mass flow rate controlled delivery of a liquid according to the present invention.

FIG. 2 depicts a block diagram of another embodiment of the invention. With the exception of the addition of a proportional control valve 21 disposed in conduit 4, the system of FIG. 2, the system depicted in it is identical to FIG. 1. Flow rate control valve 21 is used to control the mass transfer rate of liquid out of containment column 2. In practice the user defines the required liquid mass flow rate and transfer duration. In one example the required rate is 0.1 grams per minute and the transfer duration is 10 minutes. When controller 16 receives a start command conduit 4 isolation valve 9 is opened. Sensor 1 signal transmitted via connection 15 is monitored by controller 16 and flow rate control valve 21 valve signal 22 is increased until sensor signal 1 output rate of reduction matches the target rate corresponding to a mass loss of 0.1 grams per minute.

Figure 3:
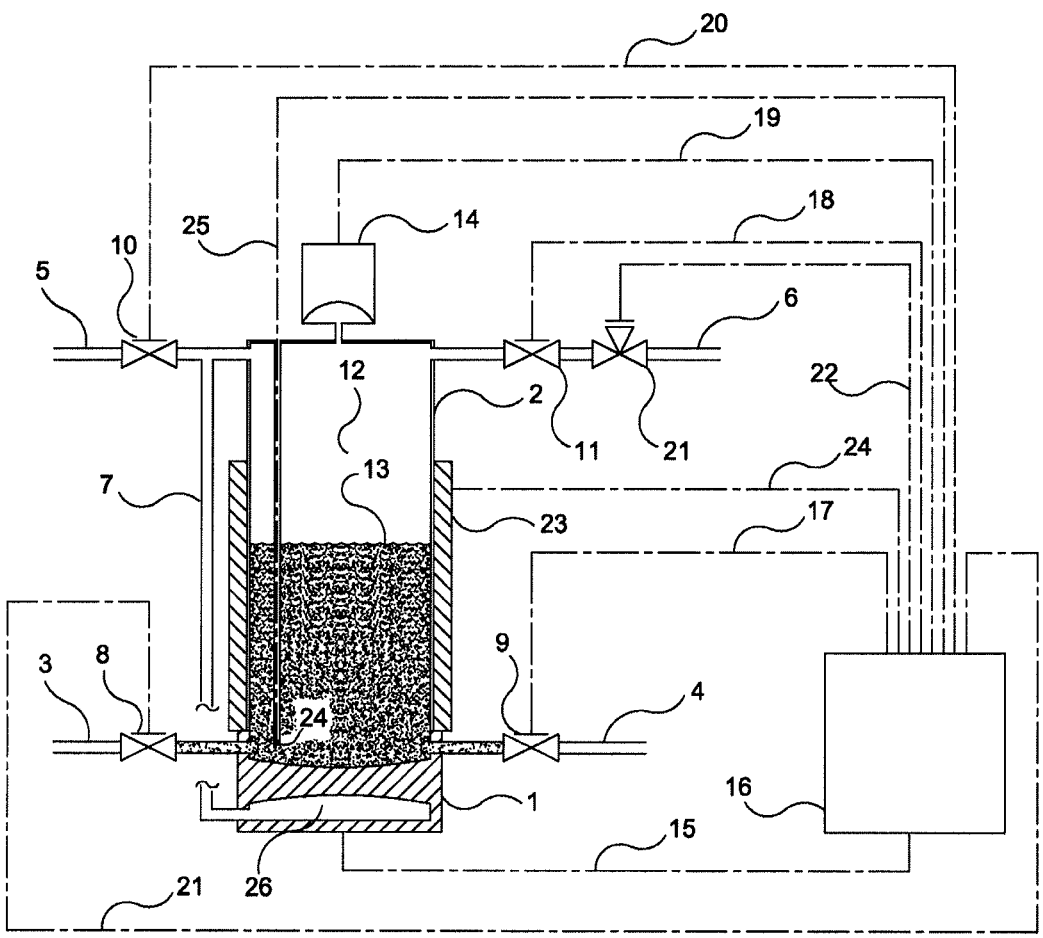
FIG. 3 is a block diagram illustrating yet another embodiment of the apparatus to support the measurement and mass flow rate controlled delivery of a vaporized liquid according to the present invention.

FIG. 3 depicts a block diagram of another embodiment of the invention. The system in FIG. 3 is similar to that shown in FIG. 2, wherein like numbers represent similar parts. However, the system of FIG. 3 allows the transmitting of the fluid in a vapor phase. To accomplish this, liquid 13 is vaporized by reducing the pressure 12 over the liquid 13 and/or by heating the liquid 13 to increase its vapor pressure. Thus, the system includes a heater 23 operatively connected via electrical connector 24 to controller 16. Also, a temperature sensor 24 is operatively connected to controller 16 by electrical connection 25. The controller 16 reads the signal from the temperature sensor 24 and adjusts the heat transmitted from heater 23 to the column 2, so that the temperature within the column 2 reaches the desired level, which is normally user defined. The controller 16 controls both the pressure 12 and temperature within column 2 so that the conditions within the column are at their desired levels. By controlling these conditions, liquid 13 in the container can be vaporized and transmitted via conduit 4 after liquid mass measurement.

In one example water vapor is required to support a sub atmospheric pressure (<1 torr) annealing process. Outlet conduit 6 is routed to a process chamber (not shown) and when isolation valve 11 opens, in response to a user input command, proportional control valve 21 input signal transmitted along connection 22 is increased by controller 16 until sensor 1 output signal 15 rate of reduction corresponds with a user defined vapor mass transfer rate. In another example, silicon tetrachloride vapor is required to support a chemical vapor deposition process. In this example the pressure in containment column 2 is increased to and controlled at the user defined value by controller 16. Thermal energy is added to the liquid by internal or external heating means 23. Controller 16 increases or decreases the addition of thermal energy as required to hold pressure 12 within the container at the desired value.

While embodiments of the invention have been illustrated and described in detail in the disclosure, the disclosure is to be considered as illustrative and not restrictive in character. All changes and modifications that come within the spirit of the invention are to be considered within the scope of the disclosure.

What is claimed is:

1. A liquid mass measurement and fluid transmitting apparatus comprising:
   a container configured to contain liquid for measurement of mass thereof;
   a sensor, operatively engaged to said container, to produce one or more electrical signals proportional to a mass of liquid within said container independent of variations in pressure on said liquid, said sensor comprising:
   a diaphragm oriented to sense changes in the mass of liquid within said container, wherein said diaphragm is positioned wherein liquid within said container is located over said diaphragm;
   an inlet in fluid flow communication with said container;
   an outlet in fluid flow communication with said container to allow fluid to be transmitted from said container;
   a controller electrically coupled to said sensor to receive and process said electrical signals; and a pressure equalizer to equalize the pressure on said liquid with the pressure on a side of said diaphragm opposite said liquid, wherein said pressure equalizer comprises a conduit having a first end in fluid communication within said container at a location above said liquid within said container, and a second end in fluid communication with an area proximate a side of said diaphragm facing opposite said liquid within said container.

2. The apparatus of claim 1, further comprising at least one of a flow control inlet valve coupled to said inlet and a flow control outlet valve coupled to said outlet.

3. The apparatus of claim 2, wherein said controller is electrically coupled to one or more of said flow control inlet valve and said flow control outlet valve.

4. The apparatus of claim 3 further comprising a pressure sensor coupled to said container for sensing the pressure therein.

5. The apparatus of claim 4 further comprising one or more pressurization conduits coupled to said container to control the pressure exerted within said container.

6. The apparatus of claim 5, wherein said one or more pressurization conduits are coupled to one or more of the flow control inlet valve and the flow control outlet valve, said flow control inlet and outlet valves being electrically coupled to said controller.

7. The apparatus of claim 6 wherein said controller is configured to control the rate of flow of fluid transmitted from said container through said outlet.

8. The apparatus of claim 7 further comprising a temperature sensor coupled to said container and to said controller.

9. The apparatus of claim 8 further comprising a heater coupled to said container.

10. The apparatus of claim 8 wherein said controller is configured to control the temperature and pressure within said container.

11. A process for measuring a mass of liquid and transmitting fluid comprising:
  containing liquid in a container having an inlet and an outlet in fluid flow communication with said container to allow fluid to be transmitted from said container, said container, further comprising:
    a sensor, operatively engaged to said container, to produce one or more electrical signals proportional to a mass of liquid within said container independent of variations in pressure on said liquid, said sensor comprises a diaphragm oriented to sense changes in the mass of liquid within said container, wherein said fluid within said container is located over said diaphragm;
    an inlet in fluid flow communication with said container;
    an outlet in fluid flow communication with said container to allow fluid to be transmitted from said container;
    a controller electrically coupled to said sensor to receive and process said electrical signals; and
    a pressure equalizer to equalize the pressure on said liquid within the container with the pressure on a side of said diaphragm opposite said liquid, wherein said pressure equalizer comprises a conduit having a first end in fluid communication within said container and above said fluid within said container, and a second end in fluid communication with an area proximate a side of said diaphragm facing opposite said liquid within said container;
  producing one or more electrical signals proportional to a mass of the liquid within said container enabling said electrical signals to represent said mass independent of variations in pressure on said liquid using a sensor operatively engaged with said container; and
  receiving and processing said electrical signals using a controller electrically coupled to said sensor.

12. The method of claim 11 further comprising a flow control inlet valve coupled to said inlet, and a flow control outlet valve coupled to said outlet.

13. The method of claim 12 further comprising controlling the rate of flow of fluid transmitted from said container through said outlet using said controller.

14. The method of claim 13 wherein said controller is electrically coupled to said one or more said flow control inlet valve and said flow control outlet valve.

15. The method of claim 14 further comprising controlling the pressure exerted within said container using one or more pressurization conduits coupled to said container and a pressure sensor coupled to the container.

16. The method of claim 15 further comprising sensing the temperature within the container using a temperature sensor coupled to said container and to said controller.

17. The method of claim 16 further comprising heating the fluid within the container using a heater coupled to said container.

18. The method of claim 17 further comprising controlling the temperature and pressure within said container to allow said fluid to change from a liquid to a vapor using said controller.

19. A liquid mass measurement and fluid transmitting apparatus comprising:
  a container configured to contain liquid for measurement of mass thereof;
  a sensor, operatively engaged to said container, to produce one or more electrical signals proportional to a mass of liquid within said container independent of variations in pressure on said liquid;
  an inlet in fluid flow communication with said container to allow fluid to be transmitted into said container;
  an outlet in fluid flow communication with said container to allow fluid to be transmitted from said container;
  at least one pressure control valve in fluid flow communication with said container to allow pressurized fluid to flow within and escape from said container; and
  a controller electrically coupled to said sensor to receive and process said electrical signals;
  wherein the inlet, the outlet, and the at least one pressure control valve are each positioned in a closed position to form a closed system.

20. The apparatus of claim 19, wherein the sensor comprises a diaphragm oriented to sense changes in the mass of liquid within said container and said diaphragm is positioned wherein liquid within said container is located over said diaphragm.

21. The apparatus of claim 20, further comprising:
  a pressure equalizer to equalize the pressure on said liquid with the pressure on a side of said diaphragm opposite said liquid and said pressure equalizer comprising a conduit having a first end in fluid communication within said container at a location above said liquid within said container, and a second end in fluid communication with an area proximate a side of said diaphragm facing opposite said liquid within said container.

22. The apparatus of claim 21, further comprising:
  one or more pressurization control conduits coupled to said container to control the pressure exerted within said container and coupled to the at least one pressure control valve to open and close the pressurization conduits.

23. The apparatus of claim 22, further comprising:
A pressure sensor coupled to said container for sensing the pressure therein.

24. The apparatus of claim 23, further comprising:
at least one of a flow control inlet valve coupled to said inlet and a flow control outlet valve coupled to said outlet, wherein said controller is electrically coupled to one or more of said flow control inlet valve and said flow control outlet valve.

25. The apparatus of claim 24, further comprising:
a temperature sensor coupled to said container and to said controller for controlling the temperature within said container.

26. The apparatus of claim 25, further comprising:
a heater coupled to said container and to said controller for controlling the temperature within said container.

* * * * *